July 1, 1941.  L. B. JONES  2,247,581
RERAILING FROG
Filed Feb. 11, 1941  5 Sheets-Sheet 5
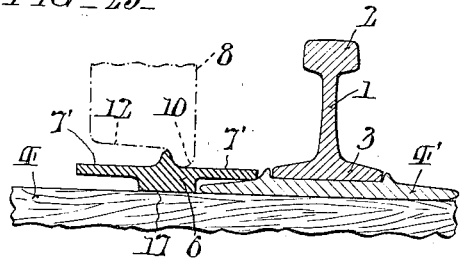
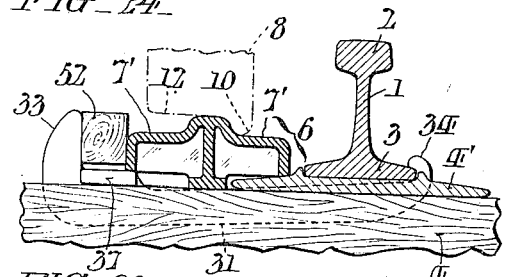
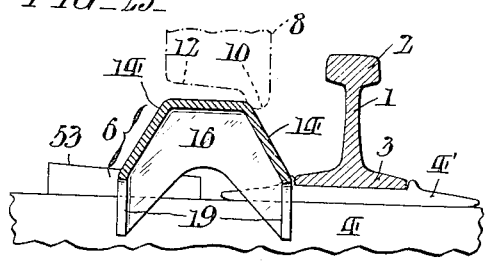
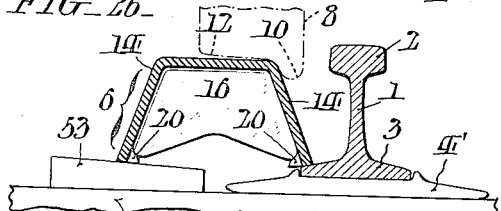
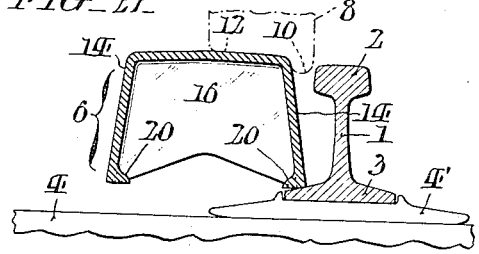
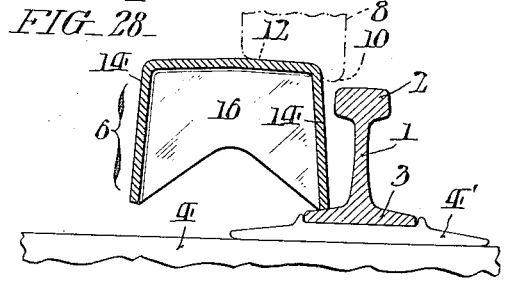
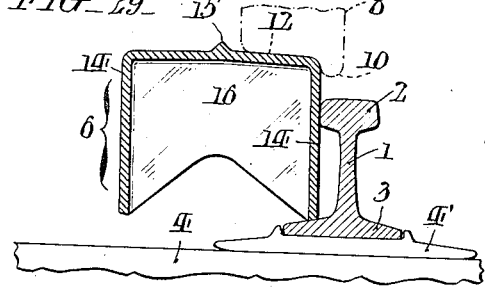
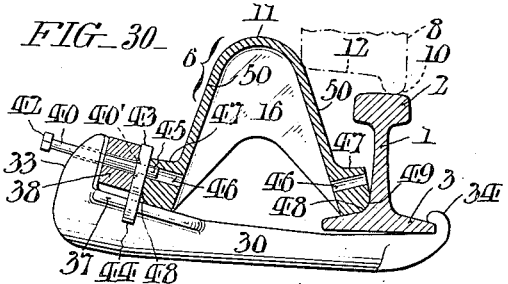
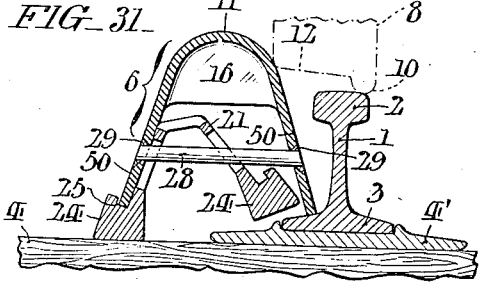
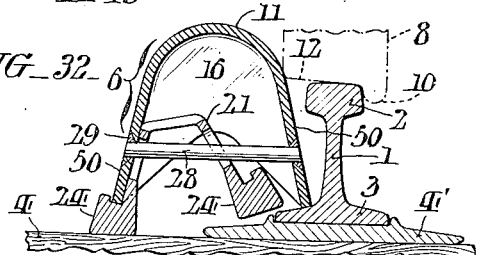
INVENTOR:
Lloyd B. Jones,
BY Paul & Paul
ATTORNEYS.

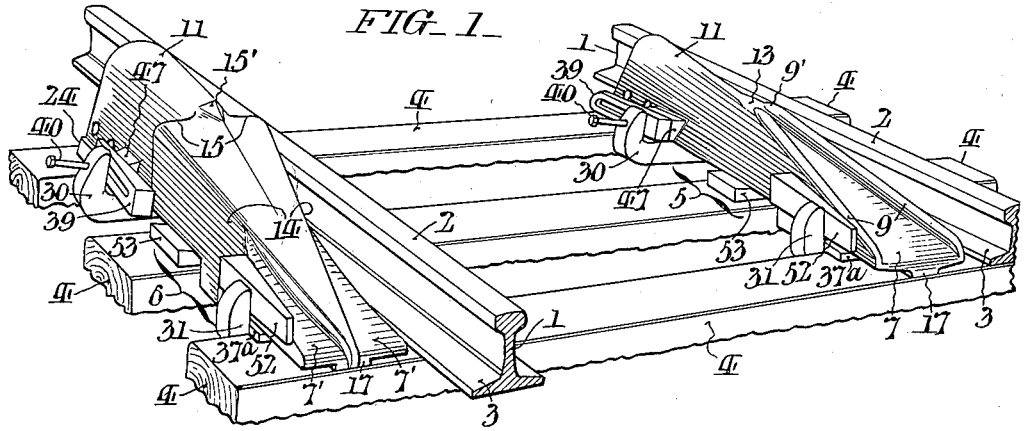

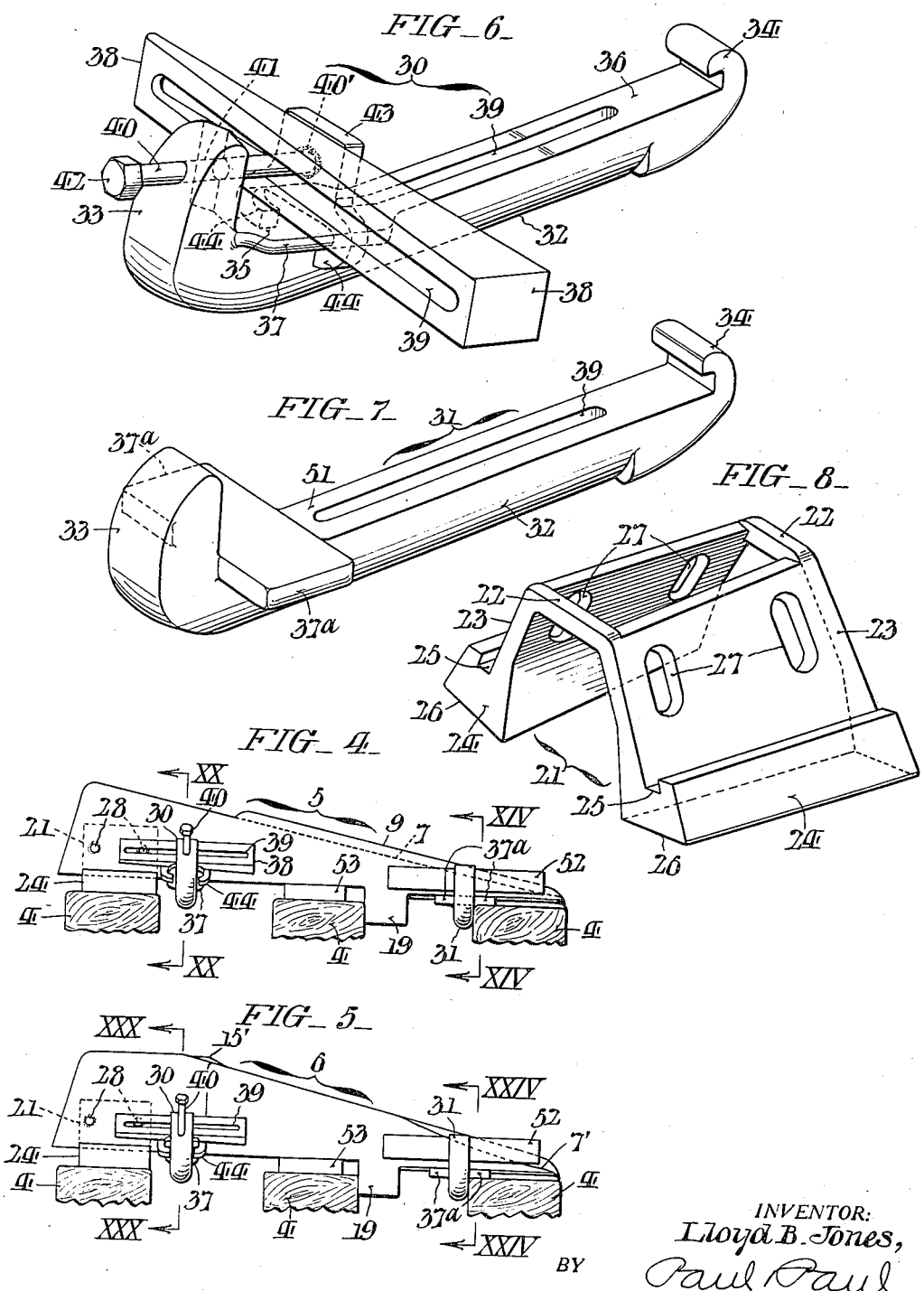

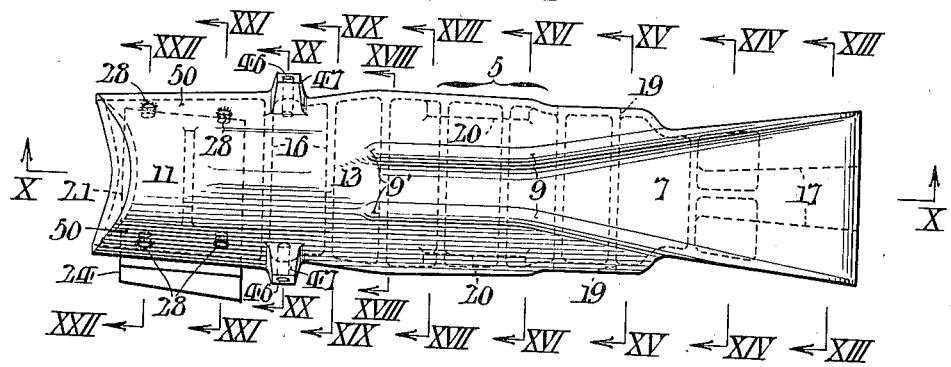
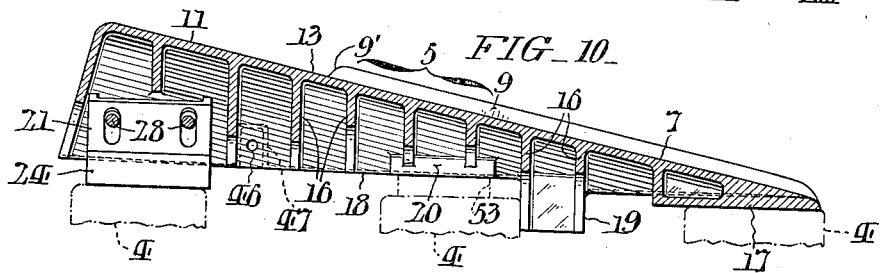
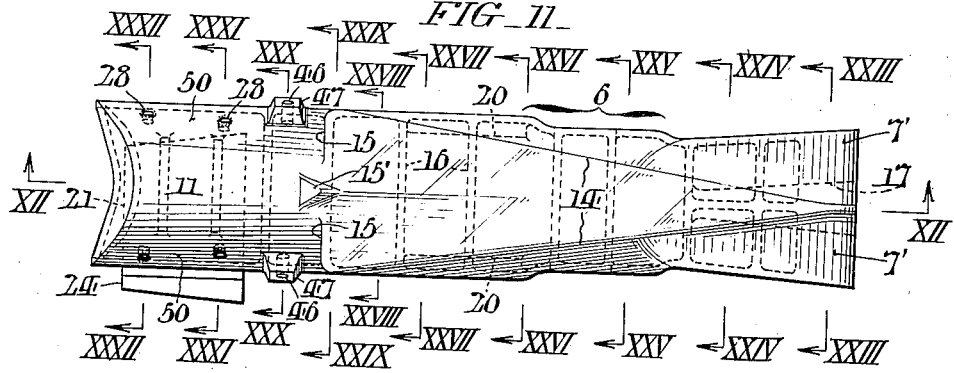
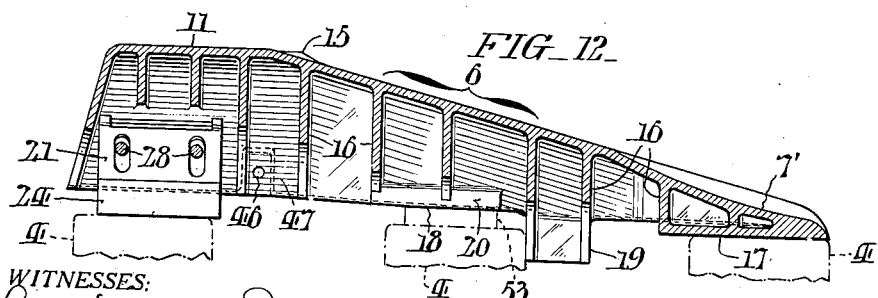

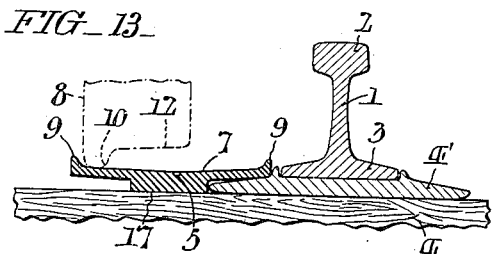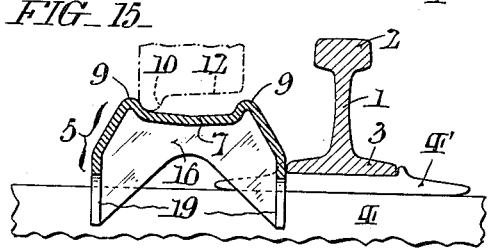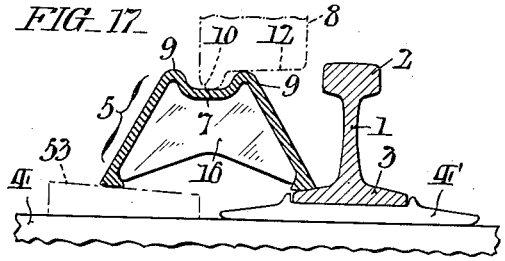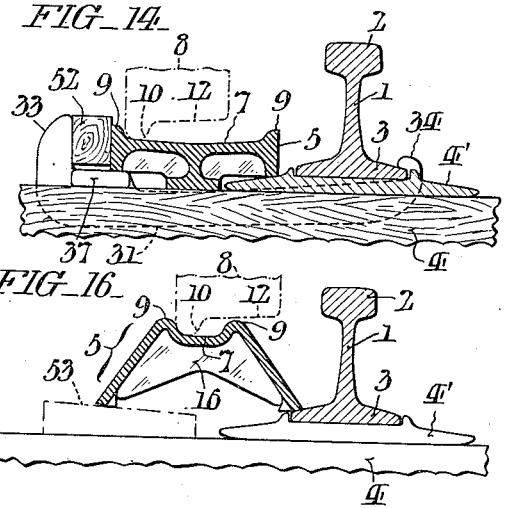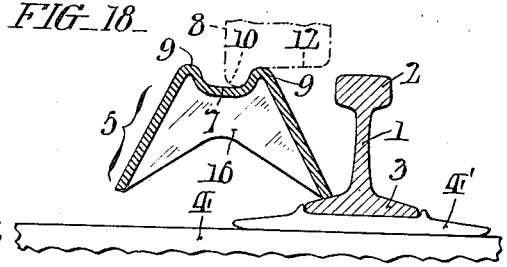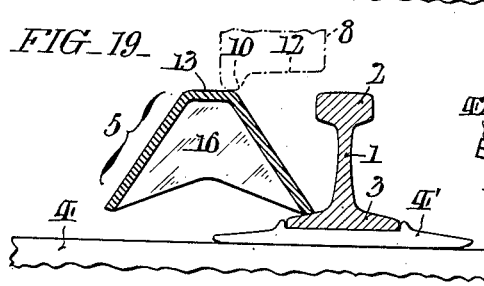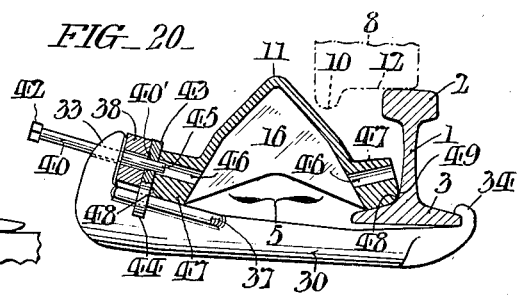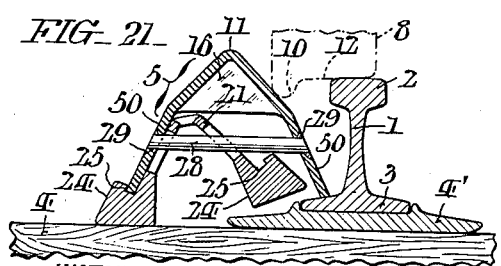

Patented July 1, 1941

2,247,581

UNITED STATES PATENT OFFICE 2,247,581

RERAILING FROG

Lloyd B. Jones, Hollidaysburg, Pa., assignor to The Pennsylvania Railroad Company, Philadelphia, Pa., a corporation of Pennsylvania Application February 11, 1941, Serial No. 378,337

10 Claims. (Cl. 104—269)

This invention relates to replacer frogs, and, more particularly to the species known as re-railing frogs employed on railroad for the purpose of returning displaced cars or locomotives onto the rails, in either direction, and from the right or left-hand of the track, such frogs being arranged in pairs commonly designated "outsides" and "insides."

The general object of this invention is to provide an improved form of frog of the above specified type that will positively direct the respective wheel flanges and treads to and onto the rail heads; or, in other words, by the use of re-railing frogs in accordance with the instant improvements derailed car and locomotive axially aligned wheels are simultaneously and definitely replaced on the rails.

Another object is to furnish a re-railing frog for railroads which is adapted for either right or left-hand service with respect to the gauge and outside of the rail.

A further object is to provide a frog of the typified species adapted for definite bearing, on the base of the associated rail, at its high end.

Still further objects have reference to structural refinements whereby the efficiency and adaptability of the improved re-railing frog are greatly enhanced.

The above stated objects, with ancillary advantages, of this invention will be clearly apparent from the following detailed explanation of the selected embodiment thereof exemplified by the accompanying illustrative drawings, wherein like reference characters designate corresponding parts in all the views; while the concluding claims more particularly define the features of novelty over the prior art.

In the drawings:

Fig. 1 is a perspective view of a railroad track section showing a pair of the improved re-railing frogs installed.

Fig. 2 is a larger scale plan view of the right-hand portion of the preceding illustration showing the "inside" re-railing frog in position.

Fig. 3 is a similar plan view of the left-hand portion of Fig. 1, illustrating the "outside" re-railing frog.

Fig. 4 is an elevation on the plane IV—IV of Fig. 2.

Fig. 5 is a similar view on the plane indicated by the angled arrows V—V in Fig. 3.

Fig. 6 is a perspective view of the main re-railer clamp.

Fig. 7 is a similar view of a supplemental clamp.

Fig. 8 is a perspective view of the re-railing frog head support.

Fig. 9 is a top plan view of the "inside" re-railing frog.

Fig. 10 is a longitudinal vertical section on the plane designated by the angled arrows X—X in Fig. 9.

Fig. 11 is a top plan view of the "outside" re-railer frog.

Fig. 12 is a longitudinal section on the plane indicated by the angled arrows XII—XII in the preceding illustration.

Fig. 13 is a cross-section on the plane designated by the angled arrows XIII—XIII in Fig. 9, of the "inside" re-railer frog.

Fig. 14 is a similar cross-section on the plane XIV—XIV in Figs. 2, 4 and 9.

Figs. 15–19, inclusive, are cross-sections on the respectively corresponding planes indicated by Roman numerals in Fig. 9.

Fig. 20 is a cross-section on the plane XX—XX of Figs. 2, 4 and 9.

Figs. 21 and 22 are similar cross-sections on the respective planes XXI—XXI and XXII—XXII of Fig. 9.

Fig. 23 is a cross-section on the plane designated by the angled arrows XXIII—XXIII in Fig. 11 of the "outside" re-railer frog.

Fig. 24 is a similar cross-section on the plane XXIV—XXIV in Figs. 3, 5 and 11.

Figs. 25–29, inclusive, are cross-sections on the respectively corresponding planes indicated by Roman numerals in Fig. 11.

Fig. 30 is a cross-section on the plane XXX—XXX of Figs. 3, 5 and 11.

Figs. 31 and 32 are similar cross-sections on the respective planes XXXI—XXXI and XXXII—XXXII of Fig. 11.

In describing the typified embodiment of this invention illustrated by the five sheets of drawings herewith, specific terms will be employed for the sake of clarity, but it is to be understood the scope of said invention is not thereby limited; each such term being intended to embrace all equivalents capable of performing the same function for an analogous purpose.

Referring more in detail to the drawings, the rails are designated by the reference character 1, each embodying a head 2 and flange or base 3; while 4 indicates the ties and 4' conventional tie plates. The "inside" and "outside" re-railing frogs are respectively and comprehensively designated 5 and 6.

Each re-railing frog 5, 6 embodies a slope or incline 7 by which a passing car or locomotive wheel 8, indicated by dot-and-dash lines in Figs. 13-32, inclusive, is raised, said incline including guide ribs 9, Figs. 1 and 2, or guide walls 14, Figs. 1 and 3, for the wheel flange 10; and an inverted trough-like or arched extension 11, which is appropriately shaped to effect sliding projection of the wheel tread 12 onto the rail head 2, when the wheel 8 moves off the inclined portion 7. It is to be particularly noted that, in accordance with this invention, the re-railing frogs 5, 6 are designed for right or left-hand service. In other words, each frog 5 is adapted for application to the inside of the rails 1 in either direction, while the frog 6 is correspondingly applicable to the outside of each said rail, by shaping both re-railing frogs 5, 6 symmetrical with respect to its longitudinal axis, so that one pair of said frogs will effect either right-hand or left-hand re-railing. More particularly, the inside frog 5 is made right or left-hand by provision of a substantially horizontal flat or cross-over 13, best understood from Fig. 19, in the center region adjoining the crown section 11, similar to an ordinary railroad frog; while the outside frog 6 serves as a guard rail to force the wheel flange 10 of the inside wheel 8 thereover. The outside frog 6 is adapted for right or left-hand service by provision of upward and opposingly-inclined wheel-flange guide walls 14 on the front or entrant part thereof, with said entrant end preferably concaved at 7', see Fig. 12, and an associated double drop-off extension 11 defining spaced shoulders 15, with a medial wheel-tread edge-engaging and diverting projection 15'.

The improved re-railing frogs 5, 6, as readily understood from Figs. 9-12 and 13-32, inclusive, are, preferably, each made in one piece of hollow symmetric contour longitudinally with the medial upward inclination from the wheel-entering or front end 7 to the vertically-inclined terminal end of the slip or arched extension 11, as best shown in Figs. 10 and 12, and interior spaced strengthening webs 16. It is noteworthy, at this juncture, to observe that both re-railing frogs 5, 6 are approximately corresponding and of greater height in the extensions 11 than conventionally obtains with known analogous devices, see Figs. 20-22 and 30-32 to best advantage, so that each axially aligned pair of wheels 8 drop or slide thereof simultaneously. In other words, the wheels 8 cross the rail heads 2 in unison and while so doing are subject to force progression imparted by coaction of the outside re-railing frog guide walls 14 with the flange 10 of the abutting wheel 8 and/or coaction of the outer edge of the tread or rim 12 with the diverting projection 15'. In addition, each frog 5, 6 is provided at the front end with a pad 17, for firm bearing on the underlying tie 4, with the longitudinal edges 18 at a relatively higher or spaced elevation. In order to prevent the frogs 5, 6 from longitudinal shifting when a derailed wheel 8 first engages them, an intervening pair of the webs 16 are downwardly extended to provide lugs 19 for abutment against the confronting side of an intermediate tie 4, as clearly understandable from Figs. 10, 12, 15 and 25. In addition, the frogs 5, 6 are also provided with inwardly projecting lugs 20, for a purpose later explained, said lugs being preferably located for disposal transversely over and above the intermediate tie 4.

Both re-railing frogs 5, 6 are further designed to have edge bearing on the base 3 of the rail 1 at the head end of the arched extensions 11 and in order to attain this, use is made of an adjustable support 21, see Fig. 8. Each support or filler 21, it will be seen, is of inverted somewhat channel shape in cross-section; that is to say it embodies an open rectangular top or web 22, with flanking flanges 23 having substantial foot-portions 24, including a longitudinal groove 25 adjoining the outer face of said flanges. The longitudinal underfaces 26 of the foot portions 24 are reversely inclined upwards and outwardly, relative to the horizontal, at an angle of approximately ten degrees, for a purpose later on set forth; while the flanges 23 are provided with opposed elongated slots 27 for free passage of connector rods 28, secured transversely of the frog extension 11 by end welds 29, see Figs. 21, 22 and 31, 32 to best advantage, and whereby the supports or filler members 21 are permanently connected to the frogs 5, 6 with capacity for right or left-hand tilting movement into active location, as well as for restraining them against movement in a longitudinal direction with respect to the axis of said frogs.

To secure the re-railing frogs 5, 6 from moving away from the respective rails 1, use is made of main and supplemental clamp 30, 31, respectively. As best shown in Fig. 6, the main rail clamp 30 comprises an elongate body portion 32 having a vertically related head 33 at one end, with a claw-hook 34 at the other end of appropriate shape to grip the confronting longitudinal edge of the rail flange or base 3, as shown in Figs. 20 and 30; while it is to be noted the top face of the body portion 32 has its end portions 35, 36 adjoining the head 33 and claw 34 upwardly inclined at differential angles with respect to the intervening horizontal portion, respectively to afford firm seating for the support 21 and clearance below the rail base 3, as later on again referred to. In addition, that portion of the clamp 30 embracing the inclined portion 35 is provided with co-planar flanking side lugs or flanges 37, for a purpose later explained. Permanently attached to the clamp head 33 is a wedge 38, adapted to seat on the flanges 37 aforesaid, preferably of steel, said wedge being longitudinally slotted at 39 for passage of an interlocking member or rod 40, also slidably engaged through a bore 41 in said clamp head, with its head 42 outwards. The inner part of the rod 40 is rigidly secured by an annular weld 40', Figs. 6, 20 and 30, in a guide member or follower 43, having hook portions 44 freely slidable along the outer edges of the clamp flanges 37, with provision of a projection or pin extension 45 therebeyond, for engagement in the bore 46 of an angle lug 47 at each side of the frog arched extension 11. It is observable that the lugs 47 are in opposing relation with their lower outer edges rounded at 48 in approximate correspondence with base fillet 49 of the rail 1, whereby the clamp 30 is rigidly held in firm engagement by the clamp flanges 37 and said rail base fillet, in either right or left-hand location, in a manner quite obvious from Figs. 20 and 30 more particularly. The arrangement of parts 38—49 just described substantially assists in keeping all of said parts in proper relative position with respect to the rail 1 and outwardly convergent respective side walls 50 of the frog extension 11 as clearly understandable from Figs. 2, 3, 21, 22, 31 and 32, more particularly.

The supplemental clamp 31 substantially corresponds with the clamp 30, accordingly corresponding reference characters are applied thereto, to obviate unnecessary repetitive description, but it is to be remarked that the upper face 51 of the body portion is a straight incline intermediate the head 33 and claw 34 inner sides, and that it is adapted for application of a solid wedge 52, Figs. 14 and 24, opposingly directed with respect to the wedge 38, conveniently although not essentially of wood, driven into position reversely with respect to the main clamp wedge 38, and disposed across the flanges 37a, one of which seats on the tie 4 depending on whether the application be right-hand or left-hand, whereby the frog 5 or 6 is effectively prevented from lateral movement, and in normal position, said flanges act as a support for the outside edge of such frogs, in respect to the rail 1, as readily understood on inspection of Figs. 4 and 5, note being had that said flanges are elevated relative to the upper face 51 of the clamp body portion 32 to ensure such support.

From the foregoing, it will be readily seen that both re-railing frogs 5, 6, by aid of the adjustable supports or fillers 21, are afforded a firm bearing, on the rail base 3 as well as the tie 4, at their high or arched extensions 11; while it is also noteworthy that said frogs are secured rigidly in position without the use of any spikes. Still further by use of the clamps 30, 31, the re-railing frogs 5, 6 are rendered readily adjustable to suit varying track conditions; in other words, if the track gauge is wide, which is very apt to be the case at a derailment, said frogs can be easily adjusted to accommodate the abnormal condition by relative movement of the wedges 38, 52 by inserting a filling piece between the angle lugs 47 and the web of the rail, so that the re-railer frog will be held solidly after the adjustment is made, in an obvious manner. Again it is noteworthy that the flanges 37 of the clamp 30 serve mainly to keep the follower 43 in position, in addition to strengthening said clamp; whereas the flanges 37a of the clamp 31 normally keep said latter mentioned frog up to place by engaging an adjacent tie 4, as well as acting in the capacity of a filler between said tie and base of the frog 5 or 6 irrespective of their right or left-hand disposition with respect to the associated rail 1; while an inclined wood block 53 is preferably driven below the inwardly projecting lugs 20 of the respective frogs 5, 6 and the intermediate tie 4, see Figs. 4, 5, and Figs. 16, 17, 26 and 27 in dot-and-dash lines. Furthermore, the arched portion angle lugs 47 serve the dual purpose of providing an abutment face for the follower 43 and wedge 38, as well as a spacing block that makes abutment contact with the web of the rail 1 and its base 3, when the respective re-railer frogs 5, 6 are clamped in position, see Figs. 20 and 30 to best advantage. Also the support or filler 21 is so shaped that the frogs 5, 6 cannot be clamped in position unless said support is in proper place with its outer wall 50 seating in the support groove 25.

The method of installing the improved re-railing frogs 5, 6 will be readily understood from Figs. 2 and 3, more particularly, but it is to be noted they should be located with the flanges 37 of the frog 6, solidly against the edge of a tie 4. Should the derailed locomotive wheels 8 be at a considerable distance away from the rails 1, the low or receiving end of the "inside" frog 5 must be laterally wedged out from the web of the rail 1 to accommodate such distance, as readily understandable by those acquainted with the art. On the other hand, should the ties 4 not be square relative to the rails 1, the "inside" re-railing frog 5 must be set with the forward extremities 9' of the guide portions 9 back or rearwards with respect to the drop-off shoulders 15 of the "outside" re-railing frog 6; and, when said frog has to be set back from the tie 4 to meet such condition the intervening space relative to the track bed should be filled with blocking to keep the frog from shifting. When the track gauge is wide, the inside frog 5 must be blocked out from the rail 1, in order to compensate for such wider gauge, otherwise, the wheels 8 may not drop down on the inside.

While a preferred embodiment of this invention has been shown in the accompanying drawings, it is to be expressly understood such drawings are for purposes of illustration only and are not to be taken as a definition of the limits of said invention, reference being had to the following claims for such determination.

Having thus described my invention, I claim:

1. Re-railing frog formed symmetrical with respect to the longitudinal axis, for right or left-hand application to track rails in either direction, and embodying an upwardly inclined wheel engaging portion with an arched extension at the higher end; means on the inclined portion as well as the arched extension for coaction with the rim of a passing wheel to force the latter across the head of adjoining rail; an angularly adjustable support within the arched extension with flanking grooves for seating reception of either side edge of said extension, the opposing side edge of the extension being sustained by the rail base; means embodied in the frog for abutment with the side of a rail tie to prevent longitudinal movement of said frog; and clamp means for securing the frog to the rail.

2. Re-railing frog formed symmetrical with respect to the longitudinal axis, for right or left-hand application to track rails in either direction, and embodying an upwardly inclined wheel engaging portion with an arched extension at the higher end; means along the inclined portion as well as the arched extension for coaction with the rim of a passing wheel to force the latter across the head of adjoining rail; an angularly adjustable support within the arched extension with flanking grooves for seating reception of either side edge of said extension, the opposing side edges of said extension rigidly seating on the rail base; lugs projecting below the frog sides intermediate its ends for abutment against an adjoining tie to prevent longitudinal movement of the frog; and main and supplemental clamps for securing the frog to the rail, said main clamp including a connected wedge and follower at one end and having a claw hook at the other for engagement with longitudinal base edge of the rail, and the supplemental clamp having opposed co-planar flanges for right or left-hand seating on the adjoining rail tie.

3. In car and the like re-railing means for railroads, inside and outside frogs symmetrically shaped with respect to their respective longitudinal axes, for right or left-hand application and in either direction; the inside frog embodying an upwardly inclined wheel-engaging portion with an aligned arch-section extension at the higher end and bored projections laterally projecting from said extension, and ribs on the frog inclined portion extending from its lower end and tapering inwardly towards the arch extension; the outside frog embodying an upwardly inclined portion, such portion progressively expanding from the lower end of said frog to the arch extension to provide right-and-left hand wheel flange guides with drop-off shoulders adjoining said extension, and a medially located wheel rim diverting projection between said drop-off shoulders; an angularly adjustable support within and loosely connected to the arch extension of the frog; an individual main clamp engageable with either of the bored projections aforesaid and a relatively spaced supplemental clamp, for jointly securing each frog to the adjoining rail; and the respective frog arch extensions rising to a height well above the rail heads to ensure simultaneous re-railing of associated car wheels with positive disposal of their flanges against the gauge side of the respective rail.

4. The combination of claim 3, wherein the laterally projecting bored projections of each frog arch extension are reversely angled upwards relative to the horizontal, and means carried by the main clamp is engageable in the bore of either projection to positively hold said clamp rigid with respect to the frog and the adjoining rail base.

5. The combination of claim 3, wherein the upwardly inclined wheel engaging portion of each frog is of inverted and progressively-varying channel section, and the arched extension is of inverted laterally-flared trough section.

6. The combination of claim 3, wherein each frog is of hollow formation and includes side walls reinforced by longitudinally spaced transverse webs; and an intermediate pair of said webs are downwardly extended, along with the intervening portions of the side walls, to define lugs for right or left hand abutment against the confronting side of a rail tie.

7. The combination of claim 3, wherein each frog is of hollow formation with a bearer pad below the lower end; the remaining portion of said frog is upwardly spaced relative to said pad and formed with intermediate inwardly directed opposing lugs; and said lower end has the upper face transversely concaved.

8. The combination of claim 3, wherein the adjustable support within the arch extension of the frog is of inverted channel formation, substantial foot-sections are formed along the flange edges with the bottom faces thereof reversely inclined upward and outwardly relative to the horizontal, a groove along each foot section flanks the adjoining channel section flange, opposed vertically directed spaced slots are formed in the support flanges, and transverse rods pass through said slots with their ends permanently secured in the side walls of the frog arch extension, whereby said support is connected to the arch extension with freedom for differential angular seating.

9. The combination of claim 3, wherein the main clamp comprises an elongate body portion having a head at one end and a claw at the other end for engaging a rail base edge; coplanar lateral flanges at each side of the body portion adjoining the head end; a follower member having hook portions slidably coacting with the outer edges of the lateral flanges; a longitudinally slotted wedge seating across the clamp body portion and lateral flanges with its active sides respectively confronting the inner face of the head end and the follower member; a connector element, having an outer enlargement, slidably engaging a bore through the clamp head and having its inner end rigidly secured to the follower; and an axial extension of said element beyond the follower engageable in either of the bored projections of the frog arch extension.

10. The combination of claim 3, wherein the supplemental clamp embodies an angularly related head at one end and a claw at the other end for hook coaction with the rail base confronting edge, and laterally disposed flanges adjoin the clamp head end, said flanges being above the level of the clamp body portion for right or left-hand seating on an adjoining railroad tie.

LLOYD B. JONES.